US012709923B2

(12) United States Patent
Camp et al.

(10) Patent No.: US 12,709,923 B2
(45) Date of Patent: Aug. 18, 2026

(54) Q-LATCH SWIVEL BALL JOINT

(71) Applicant: Cryoport, Inc., Brentwood, TN (US)

(72) Inventors: Rob Camp, Greenville, TX (US); Bret Bollinger, Yorba Linda, CA (US); Bobby Onel, Laguna Beach, CA (US); Ben Lee, Corona, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 17/715,293

(22) Filed: Apr. 7, 2022

(65) Prior Publication Data

US 2022/0325567 A1 Oct. 13, 2022

Related U.S. Application Data

(60) Provisional application No. 63/171,908, filed on Apr. 7, 2021.

(51) Int. Cl.

| | |
|---|---|
| ***E05C 1/04*** | (2006.01) |
| ***E05B 65/52*** | (2006.01) |
| ***E05C 1/00*** | (2006.01) |

(52) U.S. Cl.

CPC ............ *E05C 1/04* (2013.01); *E05B 65/5223* (2013.01); *E05C 1/002* (2013.01)

(58) Field of Classification Search

CPC .. E05B 63/0052; E05B 63/121; E05B 63/123; E05B 63/22; E05B 65/0057; E05B 65/52; E05B 65/5207; E05B 65/5215; E05B 65/5223; E05B 1/0038; E05C 1/00; E05C 1/002; E05C 1/02; E05C 1/04; E05C 1/06; E05C 1/065; E05C 2001/008; E05C 5/00; E05C 19/02; E05C 19/022; E05C 19/026;

(Continued)

(56) References Cited

U.S. PATENT DOCUMENTS 2,768,854 A * 10/1956 Wasserman ............. E05B 85/08 292/206
2,788,235 A * 4/1957 Gilmour ................. E05B 85/08 292/347

(Continued)

FOREIGN PATENT DOCUMENTS

DE 10062988 B4 10/2005
JP 08219142 A 8/1996

(Continued)

OTHER PUBLICATIONS

PCT; International Search Report & Written Opinion dated Jul. 15, 2022 in PCT Application No. PCT/US2022/023681.

(Continued)

*Primary Examiner* — Christine M Mills
*Assistant Examiner* — Faria F Ahmad
(74) *Attorney, Agent, or Firm* — Snell & Wilmer L.L.P.

(57) ABSTRACT

In general, one aspect of the subject matter described in this specification is embodied in a latch. The latch includes a ball joint. The ball joint includes a stem and a first ball positioned at a proximal end of the stem. The latch includes a casing that is configured to surround a portion of the stem and the first ball and secures the ball joint within an enclosure. The latch further includes a cap plate. The cap plate has a recess or cup that receives the first ball of the ball joint and allows the first ball to swivel within the recess or cup.

16 Claims, 4 Drawing Sheets

(58) Field of Classification Search
CPC ........ E05C 19/028; E05C 19/04; E05C 19/06; E05C 19/063; E05C 19/009; Y10T 292/0814; Y10T 292/0815; Y10T 292/0816; Y10T 292/0817; Y10T 292/082; Y10T 292/0876; Y10T 292/0878; Y10T 292/0879; Y10T 292/088; Y10T 292/0882; Y10T 292/0885; Y10T 292/14; Y10T 292/42; Y10T 292/432; Y10T 292/438; Y10T 403/32827; Y10T 403/59; Y10T 403/591; Y10T 403/592; Y10S 292/11; Y10S 292/37
See application file for complete search history.

(56) References Cited

U.S. PATENT DOCUMENTS

| | | | | |
|---|---|---|---|---|
| 3,173,344 | A * | 3/1965 | Mongitore | F16J 1/22 92/120 |
| 3,210,105 | A * | 10/1965 | Vogt | F16C 11/06 403/140 |
| 4,758,110 | A * | 7/1988 | Ito | F16C 33/20 403/140 |
| 4,831,916 | A * | 5/1989 | Leigh-Monstevens | F15B 7/08 403/135 |
| 4,875,794 | A * | 10/1989 | Kern, Jr. | F16C 11/086 29/898.044 |
| 5,139,293 | A * | 8/1992 | Zimmerman | E05C 17/56 292/DIG. 60 |
| 5,143,469 | A * | 9/1992 | Cadeddu | F16C 11/0633 403/135 |
| 5,499,570 | A * | 3/1996 | Bergelin | B60T 13/565 92/84 |
| 5,794,512 | A * | 8/1998 | Prosch | F16D 25/08 92/128 |
| 5,904,436 | A * | 5/1999 | Maughan | F16C 11/0647 403/135 |
| 6,485,218 | B1 * | 11/2002 | Martinovsky | B60T 13/52 403/135 |
| 6,581,380 | B2 * | 6/2003 | Dangel | F16D 25/12 60/591 |
| 6,584,642 | B2 * | 7/2003 | Hodson | E05F 5/08 16/86 B |
| 6,692,176 | B1 * | 2/2004 | Fladhammer | F16C 11/0695 403/135 |
| 6,899,016 | B2 * | 5/2005 | Gemeinhardt | F16D 25/08 92/187 |
| 7,056,125 | B2 * | 6/2006 | Melis | F16C 11/0638 439/8 |
| 7,188,563 | B2 * | 3/2007 | Liebig | F16J 1/22 92/187 |
| 7,441,478 | B2 * | 10/2008 | Burgstaler | B60T 11/18 248/200 |
| 9,416,805 | B2 * | 8/2016 | Cascolan | H01F 7/124 |
| 9,611,679 | B2 * | 4/2017 | Wollacott | E05C 17/46 |
| 10,815,709 | B2 * | 10/2020 | Lovasz | E05B 83/00 |
| 11,149,474 | B2 * | 10/2021 | Ciccone | E05B 85/20 |
| 11,247,650 | B2 * | 2/2022 | Colasanta | B60T 7/04 |
| 2010/0237637 | A1 | 9/2010 | Camp | |
| 2013/0307280 | A1 * | 11/2013 | Camp | E05B 17/0037 292/228 |
| 2014/0306467 | A1 * | 10/2014 | Wollacott | E05C 17/46 292/341.15 |
| 2017/0362863 | A1 * | 12/2017 | Sridhar | E05C 3/145 |
| 2019/0270413 | A1 | 9/2019 | Dellock et al. | |
| 2019/0271182 | A1 | 9/2019 | Lovasz et al. | |
| 2019/0376326 | A1 | 12/2019 | Ciccone et al. | |

FOREIGN PATENT DOCUMENTS

| | | | |
|---|---|---|---|
| JP | 2006096403 | A | 4/2006 |
| KR | 1020160148624 | A | 12/2016 |
| WO | 2019123454 | A1 | 6/2019 |

OTHER PUBLICATIONS

PCT; International Preliminary Report on Patentability dated Oct. 19, 2023 for Application No. PCT/US2022/023681.
UK; Second Examination Report dated Mar. 6, 2025 in Application No. GB 2315462.8.
EPO; Supplementary Search Report dated Jan. 31, 2025 in Application No. EP 22785375.1.
CN; 1st Office Action dated Nov. 7, 2025 in Application No. 202280038895.0.
GB; Examination Report dated Sep. 27, 2024 in Application Serial No. 2315462.8.
JPO; Office Action dated Mar. 31, 2026 in Application Serial No. 2023-561667.

* cited by examiner

Q-LATCH SWIVEL BALL JOINT

CROSS-REFERENCE TO RELATED APPLICATIONS

This application is based upon and claims priority to U.S. provisional patent application 63/171,908 entitled "Q-LATCH SWIVEL BALL JOINT" and filed on Apr. 7, 2021, the entire content of which is incorporated herein by reference

BACKGROUND

1. Field

This specification relates to a system, apparatus and/or a method to provide a secure and easily accessible locking mechanism for a shipping container.

2. Description of the Related Art

The transportation of temperature-sensitive materials requires specialized shipping containers. Some biological materials are transported in containers filled with dry ice to ensure that the materials are kept in the temperature range of −60 to −80 degrees Celsius during the transportation period. These specialized containers often experience extensive amounts of external forces while being transported or stored, including but not limited to vibrations, thermal shock, pressure differential, being dropped during handling and colliding with other objects. The containers not only must be developed with structural integrity to withstand all the external impacts, but also prevent accidental opening during shipment to protect the commodity inside and to protect the surrounding humans and environment from being exposed to dry ice and the inside commodity, especially if it is an infectious substance. While containment of the commodity inside of a shipping container is a high priority, ease of opening and closing of the container is also critical. The commodities that are placed inside a container are sometimes used for medical purposes and therefore are temperature and time sensitive. Any delays in opening and especially closing can introduce a high risk of commodity failure or a reduction of dynamic holding time.

Accordingly, there is a need for a system, apparatus and/or method to provide a secure and easily accessible locking mechanism for a shipping container.

SUMMARY

In general, one aspect of the subject matter described in this specification is embodied in a latch. In various exemplary embodiments the latch includes a ball joint. The ball joint includes a stem and a first ball positioned at a proximal end of the stem. The latch includes a casing that is configured to surround a portion of the stem and the first ball and secures the ball joint within an enclosure. The latch may further include a cap plate. The cap plate has a recess or cup that receives the first ball of the ball joint and allows the first ball to swivel within the recess or cup.

These and other embodiments may optionally include one or more other features. The latch may include a space between an interior circumference of the casing and an outer circumference of the stem of the ball joint. The casing may include a threaded exterior surface that is configured to interlock with a threaded surface of a container. The casing may include a threaded interior surface that interfaces or interlocks with a threaded outer surface of the cap plate to fasten or interlock the cap plate within the casing. The ball joint may include a second ball positioned at a distal end of the stem that is opposite the first ball.

In another exemplary embodiment the present invention may be embodied in a locking apparatus. The locking apparatus includes a latch and a receiver. The latch includes a ball joint that has a stem and a first ball positioned at a proximal end of the stem. The latch further includes a casing configured to surround a portion of the stem and the first ball and secure the ball joint within an enclosure, and a cap plate that has a recess or cup that receives the first ball of the ball joint and allows the first ball to swivel within the recess or the cup. The receiver includes a tubular member configured to hold and receive the ball joint, and a locking pin configured to secure the ball joint inside the receiver.

The ball joint may further include a second ball positioned at a distal end of the stem opposite the first ball. The tubular member may be cylindrical and hold the second ball of the ball joint inside the receiver. The ball joint and the receiver may be misaligned. The locking pin of the receiver may contact the second ball of the ball joint. The locking pin may be controllable to eject the second ball of the ball joint out of the receiver.

In another exemplary embodiment, the subject matter may be embodied in a container. The container includes a first locking apparatus that has a latch and a receiver. The latch includes a ball joint that has a stem, a first ball positioned at a proximal end of the stem and second ball positioned at a distal end of the stem opposite the first ball. The latch further includes a casing configured to surround a portion of the stem and the first ball and secure the ball joint within an enclosure, and a cap plate that has a recess or cup that receives the first ball of the ball joint and allows the first ball to swivel within the recess or the cup. The receiver includes a tubular member configured to hold the ball joint, a locking pin configured to secure the ball joint inside the receiver, and a first pushbutton located close to a distal end of the locking pin.

The container may further include a second locking apparatus that has a latch and a receiver. The latch of the second locking apparatus includes a ball joint that has a stem, a first ball positioned at a proximal end of the stem and second ball positioned at a distal end of the stem opposite the first ball. The latch of the second locking apparatus further includes a casing configured to surround a portion of the stem and the first ball and secure the ball joint within an enclosure, a space between interior circumference of the casing and outer circumference of the stem of the ball joint, and a cap plate that has a recess or cup that receives the first ball of the ball joint and allows the first ball to swivel within the recess or the cup. The receiver of the second locking apparatus includes a tubular member configured to hold the ball joint, a locking pin configured to secure the ball joint inside the receiver, and a second pushbutton located close to a distal end of the locking pin. The container may be opened by pressing the first pushbutton of the first locking apparatus to push the locking pin to eject the ball point from the receiver and pressing the second pushbutton of the second locking apparatus to push the locking pin to eject the ball point from the receiver.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices and/or methods to provide a secure and easily accessible locking apparatus, device or other mechanism to a shipping container. The locking apparatus secures the lid of the shipper to the base of the shipper. In some implementations, the locking apparatus may secure two different portions of the shipper together. The locking apparatus may be used to secure other containers or enclosures that may be of a different size or be used for a different application, such as a document storage container. The locking apparatus may include a latch or other latching device and a latch receiver. The latch may include a ball joint that is secured inside the latch receiver to lock or secure a lid of a container with the base of the container in a closed position. The latch allows the ball joint to swivel around so that the lid of the container remains secured to the base of the container even when there is a small misalignment between the lid and the base. Thus, the locking apparatus may prevent accidental opening during shipment and allow easy closure even if the lid and base of the container are slightly misaligned due to external forces.

Other benefits and advantages include the locking apparatus having a longer lifespan and remaining more durable during its lifespan because both the latch and the latch receiver of the locking apparatus are located inside a casing and within a channel or cavity of the container to protect the locking apparatus from external exposure and impact. Additionally, a shipping container may be installed with two such locking apparatuses. The container can only be fully opened when both locking apparatuses, either concurrently or consecutively, are unlocked, which may prevent accidental opening of the container during shipment.

Figure 1:
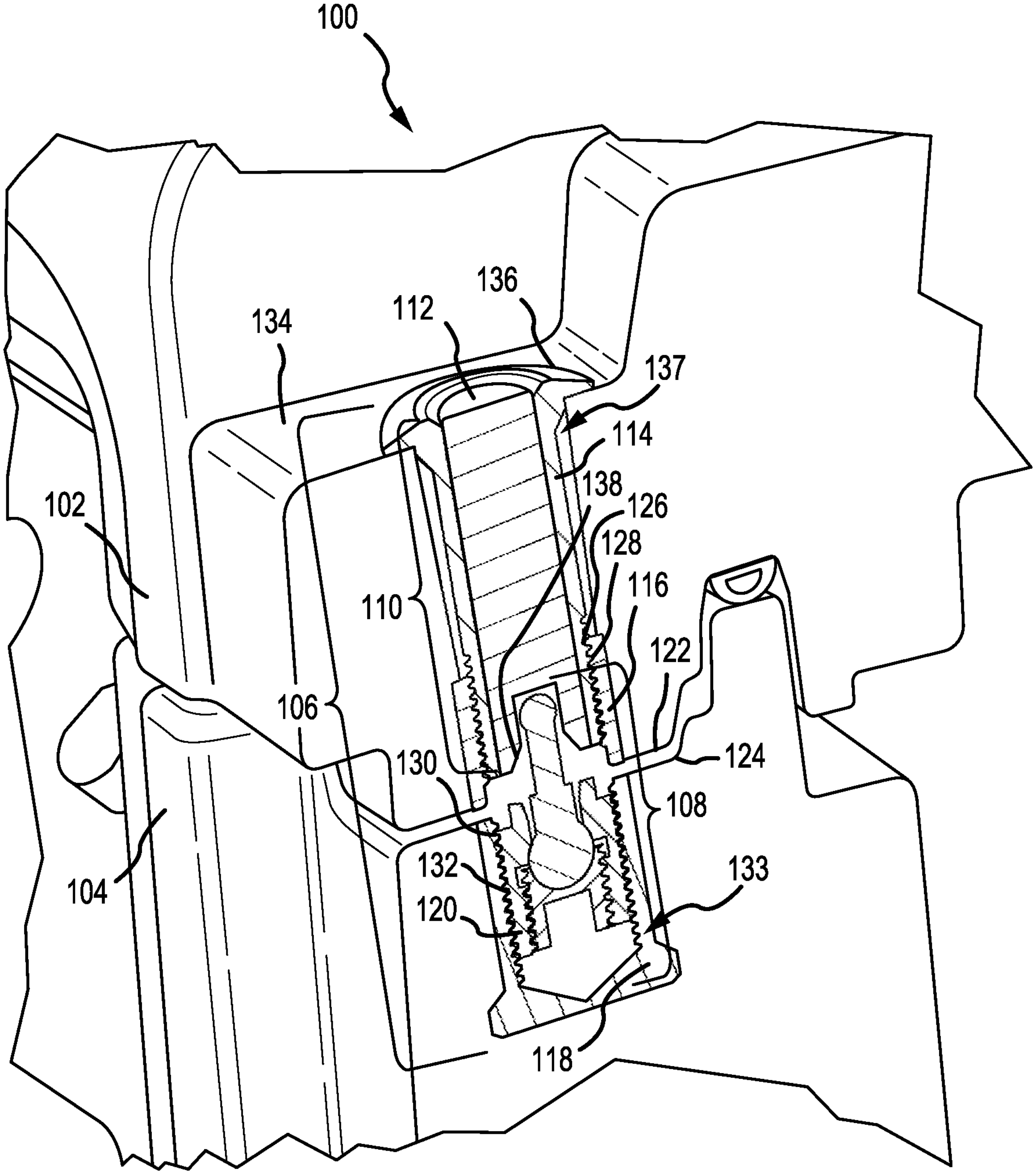
FIG. 1 shows a container installed with one locking apparatus according to an aspect of the invention.

FIG. 1 shows a container 100 installed with one or more locking apparatuses 106. The container 100 may include a lid 102, a base 104 and one or more locking apparatuses 106. The container 100 may be closed by holding the lid 102 and the base 104 together and opened by disengaging the lid 102 from the base 104. The container 100 may have one or more locking apparatuses 106 installed or affixed on it. A locking apparatus 106 may include a latch 108 and a latch receiver 110, such as a Q-latch. The latch 108 may interlock with the latch receiver 110 to close and lock the lid 102 with the base 104 of the container 100. The latch 108 may disengage from the latch receiver 110 to unlock the container 100 and allow the lid 102 to be opened. The latch 108 may be installed on the base 104 of the container 100 while the latch receiver 110 may be installed on the lid 102 of the container 100, as shown in FIG. 1 for example. Alternatively, the latch 108 may be installed on the lid 102 of the container 100 while the latch receiver 110 may be installed on the base 104 of the container 100.

The surface of the lid 102 may include one or more indentations 134, as shown in FIG. 1 for example. The one or more indentations 134 may protect an exposed distal end 136 of the latch receiver 110 from external forces when a proximal end 138 of the latch receiver 110 is inserted into a channel (hereinafter, simply referred to as a "lid channel") within the lid 102. The one or more indentations 134 may include an opening that leads to the lid channel located underneath the surface of the lid 102 that receives the proximal end 138 of the latch receiver 110. The latch receiver 110 of the locking apparatus 106 may be inserted into and/or positioned inside the lid channel. The distal end 136 is opposite the proximal end 138 of the latch receiver 110 where the latch receiver 110 interlocks with the latch 108. The distal end 136 may be located inside the lid channel underneath the surface of the lid 102 with a portion that is partially exposed on the surface of the one or more indentations 134. The latch receiver 110 may include a pushbutton 112 or other actuation device that is used to disengage the latch 108 from the latch receiver 110. The pushbutton 112 or other actuation device may be located at or close to the distal end 136 of the latch receiver 110. The pushbutton 112 or other actuation device may be located inside the lid channel underneath the surface of the lid 102 and/or flush with the surface of the one or more indentations 134 to protect the pushbutton 112 from external forces. The latch receiver 110 is further described below in reference to FIG. 4.

The surface of the lid 102 may include a lid channel 137 that receives the latch receiver 110 of a locking apparatus 106 (hereinafter "lid channel"). The latch receiver 110 may be inserted into and/or positioned inside the lid channel 137. The lid channel 137 may protect the latch receiver 110 from external forces. The outer surface of the latch receiver 110 may be flush with the surface of the lid 102 to protect the latch receiver 110 from impacts and/or other external forces. The lid channel 137 may include a first opening located on the inner surface of an edge 122 of the lid 102 where the lid 102 meets the base 104. The proximal end 138 of the latch receiver 110 may be inserted and positioned at the first opening of the lid channel 137 where the latch receiver 110 interlocks with the latch 108. The lid channel 137 may include a second opening located or positioned on the one or more indentations 134 in the surface of the lid 102. The distal end 136 of the latch receiver 110 may be located at the second opening of the lid channel when the proximal end 138 is inserted into the lid channel 137 to interlock with the latch 108. The lid channel 137 may include a threaded surface 128. The threaded surface 128 may cover a portion of the surface of the lid channel near the first opening or all of the surface of the lid channel. The threaded surface 128 of the lid channel 137 may interface or interlock with a threaded surface 126 on the casing 114 of the latch receiver 110 to secure the latch receiver 110 inside the lid channel.

The surface of the base 104 of the container 100 may include a cavity 133 (hereafter "base cavity 133"). A latch 108 of a locking apparatus 106 may be inserted into and/or positioned inside the base cavity 133. The base cavity 133 may protect the latch 108 from external forces. The surface of the latch 108 may be flush with the surface of the base 104 to protect the latch 108. The base cavity 133 may include a proximal end located on an edge 124 of the base 104 where the base 104 meets the lid 102. The base cavity 133 may include a distal end opposite the proximal end. The distal end of the base cavity may be closed or open. A distal end of the latch 108 may be positioned at the proximal end of the base cavity 133 to interlock with the latch receiver 110. The proximal end of the base cavity 133 may include a first opening located on the inner surface of the edge 124 of the base 104. The first opening of the base cavity 133 may be aligned with the first opening of the lid channel located on the inner surface of the edge 122 of the lid 102 when the lid 102 is closed so that the distal end of the latch 108 may extend or be positioned within the latch receiver 110 that is positioned inside the lid channel to interlock the latch 108 with the latch receiver 110. The base cavity 133 may include a threaded surface 130. The threaded surface 130 may cover a portion of or all the surface of the base cavity 133. The threaded surface 130 may interface or interlock with a threaded surface 132 of the latch 108 to secure the latch 108 inside the base cavity 133. The threaded surface 132 may be located on a casing 120 of the latch 108. The latch 108 is further described below in reference to FIG. 3.

In some implementations, the positioning of the one or more indentations 134, the channel or the cavity in the surface of the container 100 may be reversed between the lid 102 and the base 104. As a result, the latch receiver 110 may be positioned within a base 104 instead of the lid 102 and the latch 108 may be positioned within the lid 102 instead of the base 104. When the channel is in the surface of the base 104 (hereinafter "base channel"), the latch receiver 110 may be positioned within the base channel. When the cavity is in the surface of the lid 102 (hereinafter "lid cavity"), the latch 108 may be positioned within the lid cavity. The base channel may have or may share the same functions and/or characteristics as the lid channel described above but instead be positioned within the base 104. The lid cavity may have or may share the same functions and/or characteristics as the base cavity described above but instead be positioned within the lid 102.

The latch receiver 110 may be positioned inside a lid channel or base channel in the surface of the container 100 to protect the latch receiver 110 from external forces. The latch receiver 110 may be positioned closely or tightly inside the channel so that the latch receiver 110 is secured within. The latch receiver 110 may include a casing 114 with a threaded surface which may interface or interlock with a threaded surface of the lid channel or base channel to secure the latch receiver 110 inside the channel. For example, when the latch receiver 110 is positioned inside a lid channel, its casing 114 may include a threaded surface 126 which may interface or interlock with the threaded surface 128 of the lid channel to fasten the latch receiver 110 into the lid channel of the lid 102.

The latch receiver 110 may include a proximal end located on or close to the edge 122 of the lid 102 or the edge 124 of the base 104 where the lid 102 and the base 104 interface. The proximal end of the latch receiver 110 may receive a distal end of the latch 108 and secure the latch 108 inside the latch receiver 110 to interlock the latch receiver 110 with the latch 108. The latch receiver 110 may include a distal end located on or close to the one or more indentations 134 in the surface of the lid 102 or the base 104. The latch receiver 110 may include a pushbutton 112 or other actuation device that is located at or close to the distal end of the latch receiver 110 and used to disengage the latch receiver 110 from the latch 108. When the locking apparatus 106 is locked and the pushbutton 112 or other actuation device of the latch receiver 110 is depressed, the pushbutton 112 or other actuation device may eject the distal end of the latch 108 from within the latch receiver 110 and disengage the latch 108 from the latch receiver 110 to unlock or open the container 100.

The casing 114 of the latch receiver 110 may cover and enclose the latch receiver 110. The casing 114 may protect the latch receiver 110 from external forces. In some implementations, the latch receiver 110 may be installed or affixed to the container 100 using a fastener. The fastener may be used along with the threaded surfaces to couple the latch receiver 110 within the lid 102 or the base 104. The fastener may be a bolt, a screw, a hinge, or a variant of thereof. The fastener may be located in the surface of the container 100 at or near the lid channel or base channel. For example, when the latch receiver 110 is positioned inside a lid channel, the fastener may be located on an edge 116 of the lid channel.

The latch 108 may be positioned inside a base cavity or lid cavity in the surface of the container 100 to protect the latch 108. The latch 108 may be positioned closely or tightly into the cavity so that the latch 108 is secured and does not fall out of or slide out of the cavity due to external forces. The latch 108 may include a casing 120 that has a threaded surface which may interface or interlock with a threaded surface of the base cavity or lid cavity to secure the latch 108 inside the cavity. For example, as shown in FIG. 1, the latch 108 may be positioned inside a base cavity, and the casing 120 of the latch 108 may include a threaded surface 132, which may interface or interlock with a threaded surface 130 of the base cavity.

The latch 108 may include a distal end located on or close to the edge 124 of the base 104 or the edge 122 of the lid 102 where the lid 102 and the base 104 meet. The distal end of the latch 108 may be positioned and secured inside an enclosure of the latch receiver 110 to interlock the latch 108 with the latch receiver 110. When the distal end of the latch 108 disengages from the latch receiver 110, the latch 108 may disengage from the latch receiver 110 to unlock the locking apparatus 106. In some implementations, the latch 108 may be installed or affixed to the container 100 using a fastener. The fastener may be used along with the threaded surfaces to couple the latch 108 within the base 104 or the lid 102. The fastener may be a bolt, a screw, a hinge, or a variant of thereof. The fastener may be located in the surface of the container 100 at or near the base cavity or lid cavity. For example, when the latch 108 is positioned inside a base cavity, the fastener may be located on an edge 118 of the base cavity.

Figure 2:
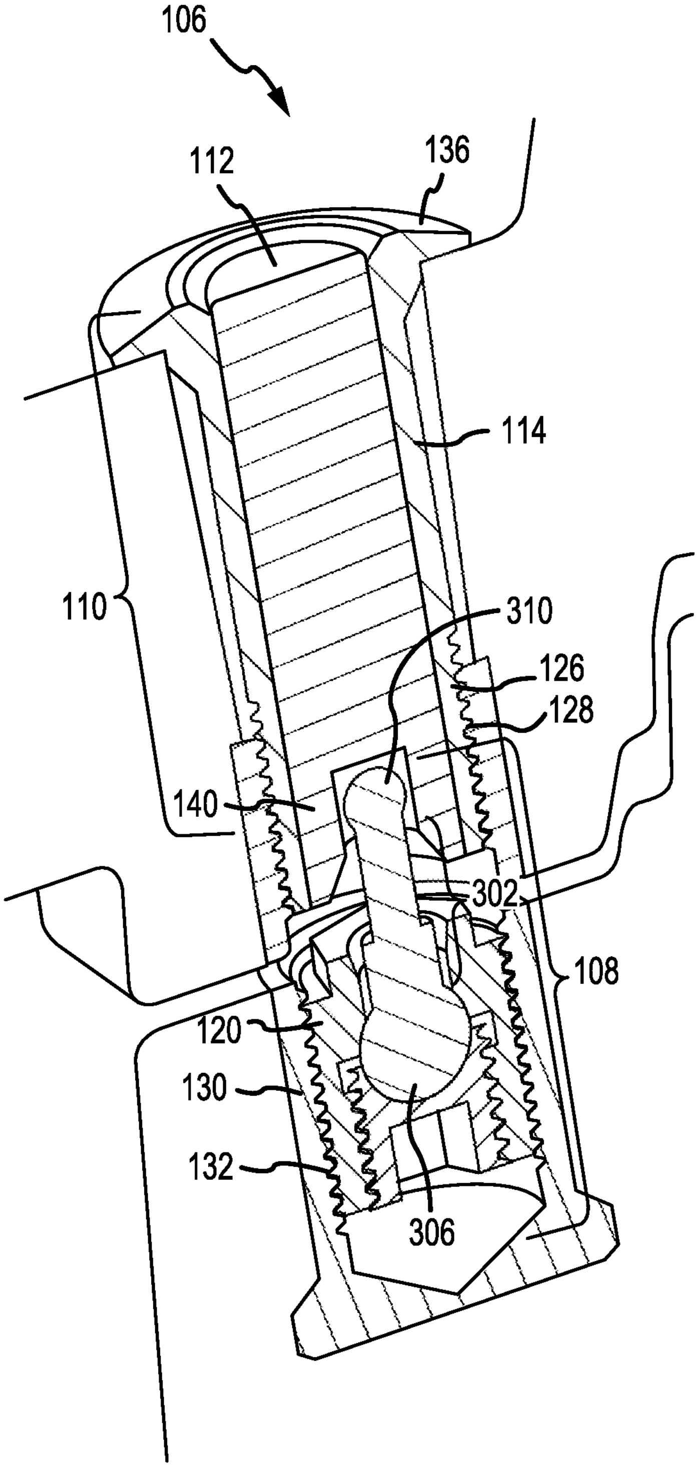
FIG. 2 shows an example of a locking apparatus, including a latch and a latch receiver, according to an aspect of the invention.

The container 100 may include one or more locking apparatuses 106. FIG. 2 shows a locking apparatus 106. Each of the one or more locking apparatuses may have a latch receiver 110 and a latch 108. The one or more locking apparatuses 106 may include a first locking apparatus and a second locking apparatus installed or affixed on the container 100. The container 100 may include any number of locking apparatuses 106. When the container 100 includes two locking apparatuses, the container 100 may be unlocked by unlocking both the first locking apparatus and the second locking apparatus, concurrently, sequentially or consecutively, to avoid accidental opening of the container 100 resulting from external forces. For example, the two locking apparatuses 106 may need to be simultaneously depressed to unlock the lid 102 from the base 104, otherwise, when either one of the two locking apparatuses 106 is not depressed the corresponding latch 108 may remain engaged and interlocked with the corresponding latch receiver 110.

The first locking apparatus may include a first pushbutton, and the second locking apparatus may include a second pushbutton. When the first pushbutton is depressed, the first locking apparatus may eject the corresponding latch 108 positioned within the corresponding latch receiver 110 and unlock the first locking apparatus 106, and when the second pushbutton is depressed, the second locking apparatus may eject the corresponding latch 108 from the corresponding latch receiver 110 and unlock the second locking apparatus.

In some implementations, the latch 108 may remain disengaged from the corresponding latch receiver 110 until a force is applied to the lid 102 to close the lid 102 on top of the base 104 and reengage the corresponding latch 108 with the corresponding latch receiver 110. In some implementations, the lid 102 may be biased to close and apply a force to reengage the corresponding latch 108 with the corresponding latch receiver 110. The pushbuttons of the first locking apparatus and/or the second locking apparatus may be located on or close to the one or more indentations 134 in the surface of the lid 102 or the base 104 to protect the pushbuttons from external forces to avoid accidental opening of the container 100.

When the latch 108 and the latch receiver 110 are installed on the lid 102 and the base 104 of the container 100, respectively, or vice versa, the latch 108 may be allowed to swivel or move around to correct for misalignment between the latch 108 and the latch receiver 110 due to impact of external forces on the lid 102 and/or the base 104. If the latch 108 and the latch receiver 110 are misaligned, this may prevent the distal end of the latch 108 from being secured inside the latch receiver 110 or may cause the distal end of the latch 108 to disengage from the latch receiver 110, which may unlock the locking apparatus 106. Thus, since the latch 108 may swivel or move around to correct the misalignment and/or realign the latch 108 with the latch receiver 110, the latch 108 may engage and interlock with the latch receiver 110 and/or maintain the engagement with the latch receiver 110 so that the container 100 closes or remains closed.

Figure 3:
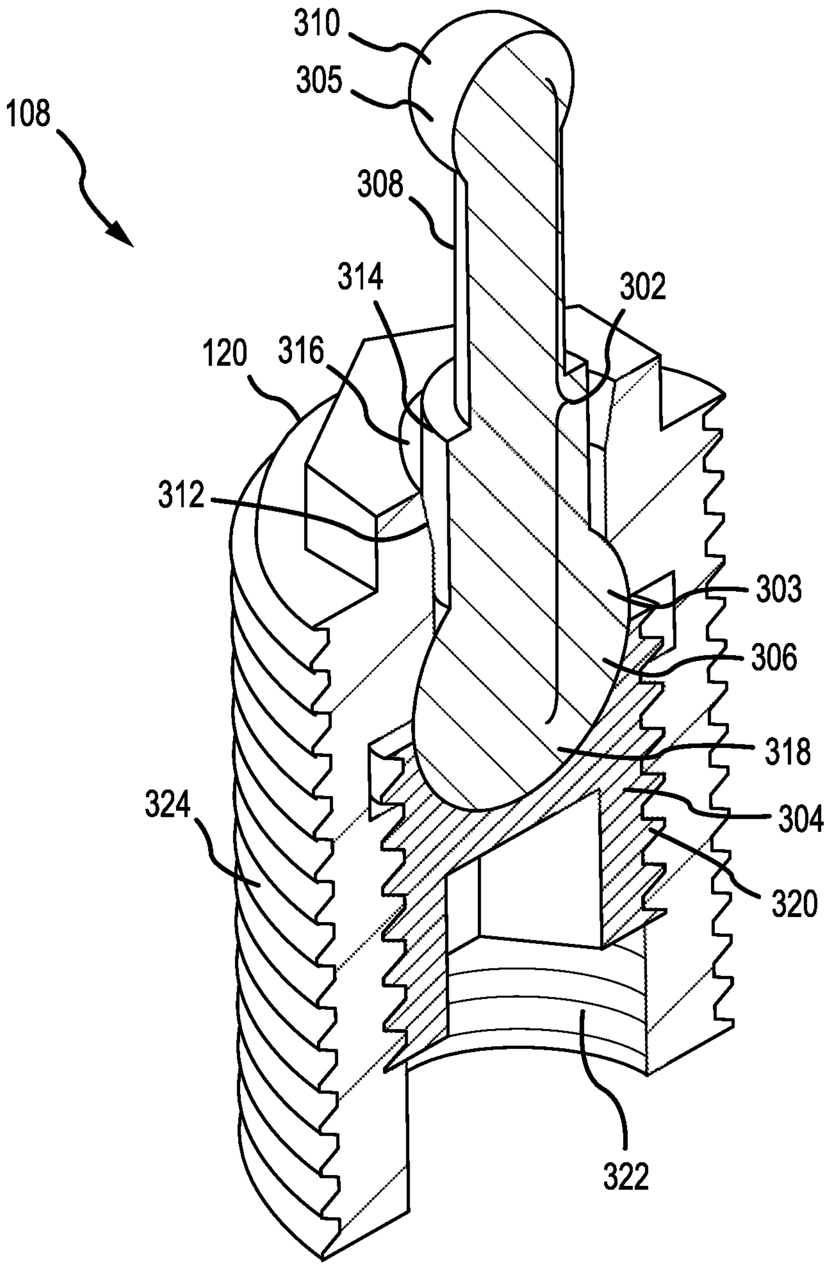
FIG. 3 shows a cross-section view of a latch according to an aspect of the invention.

Referring now to FIGS. 2 and 3, the latch 108 may include a ball joint 302, a casing 120 and a cap plate 304. The ball joint 302 may include a proximal end 306, a distal end 310 and an elongate member 308, such as a stem, in between and connecting the proximal end 306 and the distal end 310.

The ball joint 302 may be a double-ball joint or a single-ball joint. The ball joint may include a first ball 303 at the proximal end 306 and/or a second ball 305 at the distal end 310. The first ball 303 and/or the second ball 305 may be spherical or semi-spherical in shape. The proximal end 306 with the first ball 303 may be positioned within the cap plate 304 and the casing 120. The proximal end 306 may include a first ball 303 which may contact the cap plate 304 and swivel around within a recess or cup of the cap plate 304 within the casing 120. The distal end 310 with the second ball 305 may be positioned opposite the proximal end 306 with the first ball 303.

Referring still to FIGS. 2 and 3, the second ball 305 may be secured within an enclosure of the latch receiver 110 to interlock the latch 108 with the latch receiver 110. When the second ball 305 is ejected from the latch receiver 110, the latch 108 may disengage from the latch receiver 110 and unlock the locking apparatus 106 and the container 100 (e.g., see FIG. 1). The diameter of the first ball 303 may be smaller than, equal to, or larger than the diameter of the second ball 305. The diameter of the elongate member 308 may be smaller than the diameter of the first ball 303 and/or the diameter of the second ball 305. The elongate member 308 may have the same diameter through its entire length or have different diameters along its length.

The casing 120 may surround the proximal end 306 and a portion of the elongate member 308 of the ball joint 302 to secure the ball joint 302 within an enclosure of the casing 120. The casing 120 may have an interior surface 322 and an exterior surface 324. The exterior surface 324 may have a threaded portion, such as the threaded surface 132. The threaded surface 132 may interface or interlock with a threaded surface of a container 100 to secure the latch 108 within the container 100 (e.g., see FIG. 1). The latch 108 may be positioned inside a base cavity or lid cavity in the surface of the container 100 to protect the latch 108 from external forces. The threaded surface 132 may interface or interlock with the threaded surface 130 of the base cavity or a threaded surface of a lid cavity. The interior surface 322 of the casing 120 may be threaded. The threaded interior surface 322 may interface or interlock with a threaded outer surface 320 of the cap plate 304 to secure the cap plate 304 inside the casing 120.

The diameter of the casing 120 may vary at different parts. For example, the size of the casing 120 may decrease at parts where the casing 120 encloses the elongate member 308 of the ball joint 302. In another example, the size of the casing 120 may increase at parts where the casing 120 encloses the proximal end 306 of the ball joint 302. The latch 108 may include a space 316 between an inner circumference 312 of the casing 120 and an outer circumference 314 of the elongate member 308. The space 316 may allow the elongate member 308 to move or swivel around within an enclosure of the casing 120 when the first ball 303 at the proximal end 306 of the ball joint 302 swivels around inside the casing 120. When the latch 108 and the latch receiver 110 are misaligned due to external forces, the first ball 303 of the ball joint 302 may move and/or swivel around inside the cup or recess 318 of the cap plate 304 and within the casing 120 so that the second ball 305 of the ball joint 302 realigns with the enclosure of the latch receiver 110. The realignment between the latch 108 and the latch receiver 110 may keep the second ball 305 of the ball joint 302 secured within the latch receiver 110 if the locking apparatus 106 is locked or allow the second ball 305 of the ball joint 302 to be received within the enclosure of the latch receiver 110 to interlock the latch 108 with the latch receiver 110 if the locking apparatus 106 is unlocked.

The cap plate 304 may interface with the first ball 303 of the ball joint 302 and the interior surface 322 of the casing 120. The cap plate 304 may have a recess or cup 318 that receives the first ball 303 and allows the first ball 303 to swivel within the recess or cup 318. The cap plate 304 may have a threaded outer surface 320 which may interface or interlock with the threaded interior surface 322 of the casing 120 to fasten or interlock the cap plate 304 within the casing 120.

Figure 4:
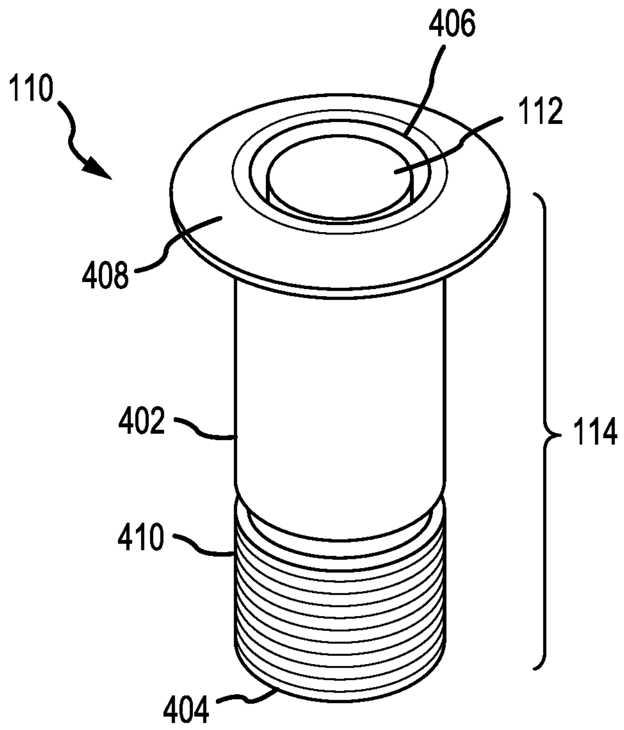
FIG. 4 shows a latch receiver according to an aspect of the invention.

FIG. 4 shows a latch receiver 110. The latch receiver 110 may be a Q-latch. The latch receiver 110 may include a pushbutton 112 or other actuation device and a casing 114. The casing 114 may include a hollow elongate tubular member 402, which encases or surrounds the pushbutton 112 or other actuation device, and a head 408 which may protect the latch receiver 110 from external forces. The elongate tubular member 402 may include a first end 404 and a second end 406. The tubular member 402 may be cylindrical and have a hollow channel within. The first end 404 of the tubular member 402 may be open allowing the distal end 310 of the ball joint 302 of the latch 108 (e.g., see FIG. 3) to enter and get secured inside the hollow channel. A portion or all of the second end 406 may be covered by the head 408. The head 408 may have a diameter larger than the diameter of the second end 406 and may be flush with the surface of the one or more indentations 134 (e.g., see FIG. 1) in the lid or one or more indentations in the base when the latch receiver 110 is inserted into a lid channel or base channel. The elongate tubular member 402 may hold and secure the distal end 310 of the ball joint 302 inside the hollow channel (e.g., see FIGS. 1 and 3).

The elongate tubular member 402 may include a threaded outer surface 410. The threaded outer surface 410 may cover a portion or all of the surface of the elongate tubular member 402. The threaded outer surface 410 may interface or interlock with the threaded surface 128 of the lid channel or a threaded surface of a base channel to secure the latch receiver 110 within a lid channel or base channel of the container 100 (e.g., see FIG. 1).

Referring now back to FIG. 1, the latch receiver 110 may include a pushbutton 112 or other actuation device which may be pressed to disengage the latch receiver 110 from the latch 108 and unlock the lid 102 from the base 104. The pushbutton 112 or other actuation device may control the unlocking of the locking apparatus 106. For example, pressing the pushbutton 112 may disengage the latch 108 from the latch receiver 110 and unlock the locking apparatus 106. The pushbutton 112 or other actuation device may be located at the distal end of the latch receiver 110 on or close to the one or more indentations 134 in the surface of the lid 102 or one or more indentations in the surface of the base 104 to protect the pushbutton 112 or other actuation device from external forces and avoid accidental opening of the container 100. The pushbutton 112 or other actuation device may be located inside the lid channel or the base channel below the surface of the one or more indentations 134 in the surface of the lid 102 or one or more indentations in the surface of the base 104.

Referring now back to FIG. 2, the pushbutton 112 or other actuation device of the latch receiver 110 may be connected to a locking pin 140 located inside the hollow channel of the latch receiver 110. The locking pin 140 may include a distal end located inside the hollow channel of the latch receiver 110 to interface with the ball joint 302. The locking pin 140 may include a proximal end opposite the distal end. The proximal end may interface with or be integrally formed with the pushbutton 112 or other actuation device. The locking pin 140 may have a longitudinal length from its proximal end into the hollow channel of the latch receiver 110 to its distal end. The locking pin 140 may interface with the distal end 310, such as the second ball 305, of the ball joint 302 of the latch 108 inside the hollow channel of the latch receiver 110. When the pushbutton 112 is depressed, the locking pin 140 may be pushed to eject the second ball 305 of the ball joint 302 of the latch 108 and unlock the locking apparatus 106 and/or the lid 102 from the base 104. When a force is applied to insert the second ball 305 of the ball joint 302 into the hollow channel of the latch receiver 110, the locking pin 140 may be pressed or pushed outward toward its proximal end and allow receipt of the second ball 305 within the hollow channel of the latch receiver 110 to interlock the latch 108 and the latch receiver 110.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A latch, comprising:

a ball joint including a stem comprising a first cylindrical section and a second cylindrical section, the first cylindrical section having a greater diameter than the second cylindrical section, and a first ball positioned at a proximal end of the stem attached to the first cylindrical section, and a second ball positioned at a distal end of the stem attached to the second cylindrical section, wherein an annular shoulder joins the first cylindrical section and the second cylindrical section;

a casing having a first opening at an end of the casing and through which the stem of the ball joint extends, wherein the annular shoulder is disposed within the first opening, wherein the casing surrounds a portion of the stem and the first ball and secures the first ball of the ball joint and the portion of the stem within an interior space of the casing; and a cap plate that has a completely threaded cylindrical exterior and that has a U-shaped cross-section and that is disposed completely inside the interior space of the casing and that is spaced apart from the first opening, the cap plate disposed at an end of the casing opposite the first opening and having the first ball between the first opening and the cap plate, wherein the entire threaded cylindrical exterior of the cap plate is completely received into the casing and joined to the casing by corresponding threads of the casing, wherein a combination of the casing and the cap plate retains the first ball in a recess defined only by the cap plate and the casing, wherein the cap plate receives the first ball of the ball joint in the recess and allows the first ball to swivel within the recess, wherein the cap plate continuously and abuttingly contacts at least an entire hemisphere of the first ball; and wherein the stem extends outwardly from the recess through the first opening, the first opening being a single and only opening defined into the recess, wherein the first opening is defined through the casing, and wherein the first opening is smaller than the first ball, wherein the casing has a threaded exterior surface that is configured to interlock with a threaded surface of a container; and a receiver having a conic opening aligned with the ball joint to selectably retain the second ball inside the conic opening of the receiver.

2. The latch of claim 1, wherein the latch comprises a space between interior circumference of the casing and outer circumference of the stem of the ball joint.

3. A locking apparatus, comprising:

a latch having a ball joint that includes a stem and a first ball positioned at a proximal end of the stem and a second ball positioned at a distal end of the stem, the stem having two cylindrical sections, a first cylindrical section of a greater diameter and a second cylindrical section of a lesser diameter, wherein the first ball is attached to the first cylindrical section and a second ball is attached to the second cylindrical section;

a casing configured to surround a portion of the stem passing through a single opening of the casing and wherein a combination of the casing and a cap plate is configured to surround all of the first ball to retain a first side of the first ball in a recess and secure the ball joint within an enclosure;

the cap plate entirely inside the casing, fastened to the casing by threads on an entire outer wall of the cap plate received completely inside corresponding threads of the casing and contacting an entire hemisphere of the first ball, the entire hemisphere comprising a second side of the first ball opposite the stem and the single opening, wherein a combination of the casing and the cap plate retains the first ball completely and entirely in the recess defined only by the cap plate and the casing, wherein the cap plate receives the first ball of the ball joint in direct abutting contact and allows the first ball to swivel within the recess so that the stem swivels in the single opening, wherein the single opening is smaller than the first ball and larger than the stem and larger than the second ball;

wherein the stem extends outwardly from the recess through the single opening in the casing and cantilevers the second ball outward away from the casing; and a receiver having a tubular member configured to hold and receive the second ball of the ball joint and a locking pin configured to secure the second ball of the ball joint inside the receiver, the tubular member having a threaded outer surface configured to join a lid channel of a container lid by corresponding threads of the lid channel, a container having a surface, with the latch disposed in an opening of the surface, wherein the container lid is selectably secured to the container by the combination of the latch and the receiver.

4. The locking apparatus of claim 3, wherein the ball joint further comprises a second ball positioned at a distal end of the stem opposite the first ball.

5. The locking apparatus of claim 4, wherein the tubular member is cylindrical and holds the second ball of the ball joint inside the receiver.

6. The locking apparatus of claim 5, wherein the ball joint and the receiver are misaligned.

7. The locking apparatus of claim 6, wherein the locking pin of the receiver contacts the second ball of the ball joint.

8. The locking apparatus of claim 7, wherein the locking pin is controllable to eject the second ball of the ball joint out of the receiver.

9. A container comprising a first locking apparatus, the container comprising:

a base of the container defining a base cavity comprising a latch inserted into the base cavity, wherein the latch comprises:

a ball joint that includes a stem having a first cylindrical portion and a second cylindrical portion, a first ball positioned at a proximal end of the stem attached to the first cylindrical portion and second ball positioned at a distal end of the stem opposite the first ball and attached to the second cylindrical portion, wherein a diameter of the first cylindrical portion is greater than a diameter of the second cylindrical portion, and wherein an annular shoulder is defined at a union of the first cylindrical portion and the second cylindrical portion;

a casing configured to surround a portion of the stem and in cooperation with a cap plate configured to surround the entire first ball and secure the ball joint within an enclosure;

the cap plate that has a recess or cup that receives the first ball of the ball joint and abuttingly contacts an entire hemisphere of the first ball and allows the first ball to swivel within the recess or the cup, the cap plate closing an opening of the enclosure of the casing so that an only opening defined through either the casing or the cap plate is a single opening defined through the casing for passage of the stem and no other openings, wherein the single opening is smaller than the first ball and larger than the stem and larger than the second ball; and a lid of the container including an indentation with an opening leading to a lid channel having a threaded interior surface, wherein a latch receiver is inserted into the lid channel, the latch receiver comprising:

a receiver including a tubular member configured to hold the ball joint, the tubular member having a threaded outer surface configured to join the threaded interior surface of the lid channel the tubular member having a conic opening defined into the receiver to receive the second ball of the ball joint inside the receiver;

a locking pin configured to secure the second ball of the ball joint inside the receiver; and a first pushbutton located close to a distal end of the locking pin.

10. The container of claim 9, wherein the container further comprises a second locking apparatus, including:

a latch having a ball joint that includes a stem, a first ball positioned at a proximal end of the stem and second ball positioned at a distal end of the stem opposite the first ball; a casing configured to surround a portion of the stem and the first ball and secure the ball joint within an enclosure; a space between interior circumference of the casing and outer circumference of the stem of the ball joint; and the cap plate that has a recess or cup that receives the first ball of the ball joint and allows the first ball to swivel within the recess or the cup; and a receiver having a tubular member configured to hold the ball joint; a locking pin configured to secure the ball joint inside the receiver; and a second pushbutton located close to a distal end of the locking pin.

11. The container of claim 10, wherein the container is opened by pressing the first pushbutton of the first locking apparatus to push the locking pin to eject the ball point from the receiver and pressing the second pushbutton of the second locking apparatus to push the locking pin to eject the ball point from the receiver.

12. A method of operating a locking apparatus, the method comprising:

positioning a casing to retain a first side of a first ball in a recess and to surround a first portion of a ball joint of a latch, the first portion having a stem and the first ball positioned at a proximal end of the stem, wherein the stem has a first cylindrical section and a second cylindrical section that has a lesser diameter than the first cylindrical section, wherein the first ball is at a proximal end of the stem attached to a first cylindrical section, the casing surrounding the entire first portion of the ball joint;

securing the casing within a container by joining a threaded outer surface of the casing to a threaded interior surface of the container;

securing the ball joint within an enclosure;

receiving the first ball of the ball joint at a cap plate that has a recess that receives the first ball of the ball joint and abuttingly contacts an entire hemisphere of the first ball and surrounds an entire second portion of the ball joint and contacts the first ball of the ball joint directly opposite of the stem, the recess allowing the first ball to swivel within the recess, wherein the cap plate is fastened inside the casing and contacting the first ball at a second side of the first ball opposite the stem, wherein a combination of the casing and the cap plate retains the first ball in the recess defined by the cap plate and the casing, wherein the stem extends outwardly from the recess through an opening in the casing, the stem having a second ball cantilevered from the stem and away from the casing at an opposite end of the stem from the first ball, wherein the first portion of the ball joint and the second portion of the ball joint are an entirety of the ball joint except for the stem, so that the combination of the casing surrounding the entire first portion of the ball joint except for the stem and the cap plate that surrounds the entire second portion of the ball joint except for the stem that extends through the opening in the casing and the second ball;

holding and receiving the second ball of the ball joint at a receiver having a tubular member with a conic opening configured to hold and receive the second ball of the ball joint inside the conic opening; and securing the ball joint inside the receiver via a locking pin.

13. The method of claim 12, wherein the ball joint and the receiver are misaligned.

14. The method of claim 13, further comprising contacting the second ball of the ball joint with the locking pin of the receiver.

15. The method of claim 14, further comprising controlling the locking pin to eject the second ball of the ball joint out of the receiver.

16. A latch, comprising:

a ball joint including a stem and a first ball positioned at a proximal end of the stem and a second ball positioned at a distal end of the stem;

a casing that has a threaded exterior surface configured to join a base cavity of a container by corresponding threads of the base cavity, the casing defining an enclosure that is an interior cylindrical threaded cavity of the casing and that is configured to surround a portion of the stem and the first ball and secure the ball joint within the enclosure; and a cap plate having (i) a cup shape, (ii) an outer surface that is threaded on an entirety of the outer surface and the entirety of the outer surface received completely inside the interior cylindrical threaded cavity and fastened inside the casing by threads of the interior cylindrical threaded cavity and (iii) an inner surface that provides a cup-shaped recess to receive the first ball in direct and contacting relation against the first ball at a side of the first ball directly opposite of the stem, wherein a combination of the casing and the cap plate retains the first ball in the cup-shaped recess of the cap plate, wherein the combination of the casing and the cap plate define a single opening, the single opening being in the casing, wherein the cap plate receives the first ball of the ball joint in the cup-shaped recess and allows the first ball to swivel within the cup-shaped recess in direct and contacting relation against the cup-shaped recess at a side of the first ball directly opposite the stem of the first ball, and wherein the stem extends outwardly from the cup-shaped recess through the single opening in the casing, the single opening being an only opening into the interior cylindrical threaded cavity having the cap plate completely therein, wherein the cup-shaped recess is bigger than the stem and the second ball and smaller than the first ball, wherein swiveling of the first ball within the cup-shaped recess translates the second ball; and a receiver spaced apart from the casing and having a conic opening to receive the second ball, wherein the translating of the second ball moves the second ball into alignment with the conic opening.

* * * * *